United States Patent [19]
Wilhelm

[11] Patent Number: 5,944,455
[45] Date of Patent: Aug. 31, 1999

[54] LIFTING ASSEMBLY FOR USE WITH A DISCHARGE DEVICE FOR FLOWABLE GRANULAR MATERIAL

[76] Inventor: Klaus Wilhelm, Austrasse 13 B, 83022 Rosenheim, Germany

[21] Appl. No.: 08/889,626

[22] Filed: Jul. 8, 1997

[30] Foreign Application Priority Data

Jul. 15, 1996 [DE] Germany .............................. 196 28 429

[51] Int. Cl.⁶ ................................................. B65G 53/34
[52] U.S. Cl. ............................................................. 406/141
[58] Field of Search ..................... 406/113, 114, 406/115, 116, 141, 142, 143, 151, 152, 153

[56] References Cited

U.S. PATENT DOCUMENTS 5,382,117  1/1995  Rings et al. ............................... 406/39

FOREIGN PATENT DOCUMENTS 63-306126  12/1988  Japan ..................................... 406/141

Primary Examiner—Andrew C. Pike
Attorney, Agent, or Firm—Haugen Law Firm PLLP

[57] ABSTRACT

In the case of a device for the discharge of flowable material from flexible and more particularly sack or bag like containers through the use of a discharge aspiration device adapted to be introduced from above into the container, lifting tackle is provided able to be brought into holding engagement with a top edge part of the container. The lifting tackle comprises an annular or polygonal holding frame which is able to be moved in a vertical direction by attachment to a reciprocating device and on which the holding elements are secured. The holding frame has a smaller diameter than the container so that the top edge part of the container is drawn radially inward as the container is drawn upward.

8 Claims, 4 Drawing Sheets

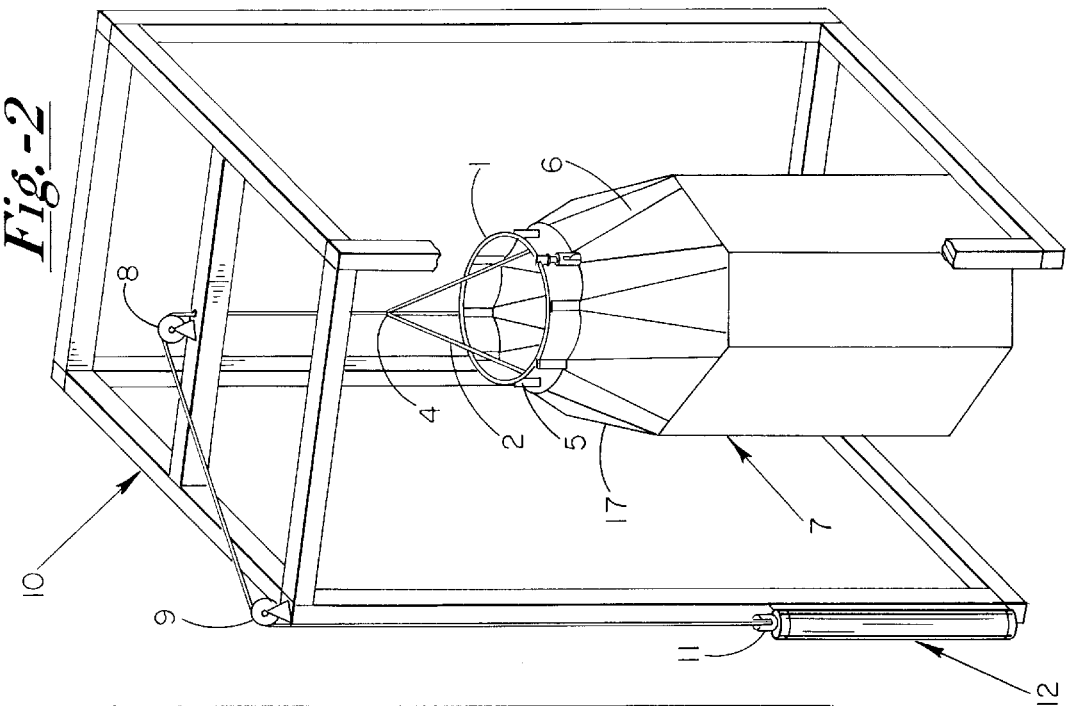
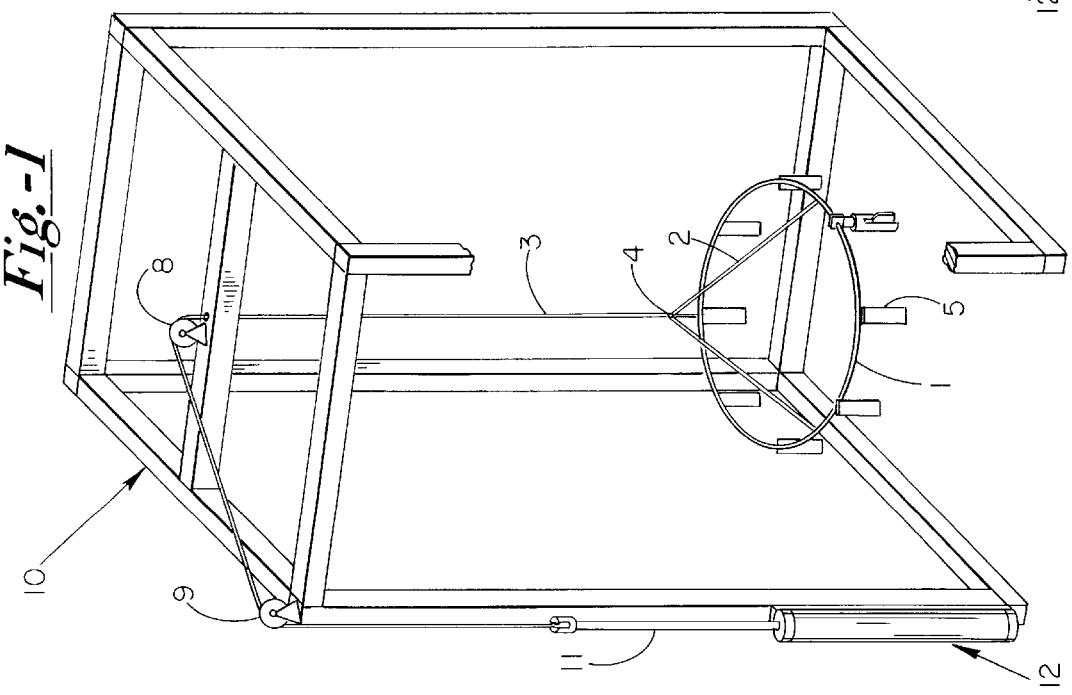

LIFTING ASSEMBLY FOR USE WITH A DISCHARGE DEVICE FOR FLOWABLE GRANULAR MATERIAL

BACKGROUND OF THE INVENTION

The invention relates to a device for the discharge of flowable granular material from flexible and more particularly sack or bag-like containers by means of a discharge aspiration device adapted to be introduced into the container from above along with a lifting assembly or tackle which engages the top part of the container using vertically movable holding elements adapted for expanding or drawing out the container.

In many fields of industry and more especially in the plastics manufacturing industry, the starting materials are in the form of flowable granular material. Such materials are frequently delivered in the form of filled canisters, so-called octabins, which are lined with an interior foil, that is to say, they have an interiorly placed foil sack, which surrounds the granular or bulk material. Furthermore, for the storage and transport of granular materials, folding boxes having an interiorly arranged foil sack, fabric sacks and/or fiber-reinforced sacks are employed. Also, bags known as big-bags may be employed, in which case, no exterior reinforcing container is provided.

Discharge from such containers is principally performed using aspiration devices, an aspiration tube like a lance, which is driven into the granular material. A disadvantage in this respect is however that such aspiration tube must be continuously swept, i.e., caused to perform a follow-up motion by hand rather like the aspiration tube of a vacuum cleaner in order to ensure an optimum depth of immersion into the material at the desired position of aspiration. This means that an operator is occupied at the point of aspiration constantly, or at least for extended periods of time. Moreover, it is not possible to avoid the foil frequently being drawn against the aspiration tube so that the aspiration operation is interrupted.

If, however, such manual sweeping action of the aspiration tube is not performed, the effect is that although the aspiration tube sucks in a part of the granular material, in the case of bins for granular material with a diameter of a meter or more, remote fractions of the granular material will not move to the point of aspiration. As the level of the material in the bin goes down, the problem becomes increasingly serious because it is hardly possible for a slope to form from the edge of the bin to the deepest position of aspiration.

It is furthermore a known practice to place foil-lined, filled bins on a tilting device and by tipping the tilting device to cause the material to be delivered at a particular point. Such a tilting device is, however, technically relatively complex and requires a large amount of space. Furthermore, such tipping equipment may not be employed to partly empty fabric sacks.

The German Patent Publication 4,218,331 A1 discloses an emptying device for discharging flowable granular material from flexible containers utilizing a discharge aspiration device. However, in this case, the granular material container is suspended at its top edge using tension springs, which represent vertically moving tilting tackle. The points of suspension at which such tension springs are attached are located just outside the base area of the shipping containers so that the top edge part of the granular material container is drawn outward owing to the tensile force of the springs in a radial direction. In the case of this known suspension device, there is however the danger that on emptying the granular material container by aspiration using a downwardly introduced discharge device, such suction effect will take place principally in the middle of the granular material container and less in the edge parts thereof so that craters will frequently be formed. This will mean that the granular material will be at a higher level in the marginal parts of the granular material container than in the middle. There will then be the danger that at certain times, the aspiration device located in the center of the granular material container will be unable to draw in any granular material, since the middle part has been cleared of material, and on the other hand, collapse of the marginal parts of the granular material will mean that the tip of the aspiration device will be relatively deeply buried. Orderly aspiration is impeded by this effect. A particular disadvantage is furthermore that owing to cratering, full discharge of the granular material from the container is only possible with difficulty or to an insufficient extent.

SUMMARY OF THE INVENTION

Accordingly, one object of the invention is to create a discharge device for removal of flowable granular material from flexible sacks or bag-like containers utilizing a discharge aspiration device, and which provides a simple way of discharging the granular or bulk material using an aspiration device, which is able to be lowered into the container without manual operation of the aspiration device and in the most even and complete manner possible.

These objects are attained by incorporating these features into a discharge device system.

In the case of a discharge device of the invention the lifting tackle comprises an annular or polygonal holding frame which is able to be moved vertically by a reciprocating device, on which the holding elements are attached, which possesses a smaller diameter than the container so that the top edge part of the container is drawn radially inward when it is pulled upward.

In the case of the device of the invention, the vertically moving holding frame is accordingly so designed that the top edge part of the container is drawn together radially inward as the holding frame is pulled upward. This radial drawing together leads to the advantage that during aspiration of the material there is a complete avoidance of the granular material being left behind at the higher level in the marginal parts of the container, since the granular material in the lateral parts immediately slides down toward the middle of the container. The complete and even discharge of the container is accordingly possible in an extremely simple manner.

The upwardly acting tensile force may preferably be so set that toward the end of the discharge operation, the entire container together with the remaining granular material is lifted clear of the ground. This takes place when the tensile force applied is larger than the remaining weight force of the granular material including the aspiration head or, respectively, aspiration tube. Accordingly, the remaining material will flow toward the aspiration tube or aspiration head now arranged at the lowest point in the container from the edge of the container toward the middle, where it may be taken up and sucked off. Therefore, practically complete discharge becomes possible without any manual intervention. The tensile force for the lifting tackle is, in this case, so set that the ultimate tensile strength of the sack material is not exceeded. Furthermore, the upward lifting of the container serves to indicate to the operator that the container is practically completely discharged so that the changing of containers can be started.

The upward lifting operation may be interrupted at any desired point in time so that it is possible at any time to move another bin to the aspiration position when a change in materials becomes necessary.

Preferably, the holding elements are regularly arranged about the periphery of the holding frame so that even lifting up and even loading of the container can be ensured. Such holding elements may, in this case, comprise clamping elements which engage the container wall on either side and suitably clamp it in position, or hooks which, if required, engage handles provided on the top edge of the container.

It is more particularly advantageous if the holding frame is suspended at three points which are regularly distributed about its periphery. Such a three-point suspension arrangement offers the advantage that the holding frame always remains aligned horizontally in a statically determined or stable fashion and undesired tilting may be prevented even in the case of uneven attachment of the lifting tackle to the container.

The three-point suspension of the holding frame preferably comprises three cables or chains of equal length which have their one end secured to cable tackle. This cable tackle is preferably arranged to extend over bend-pulleys to the lifting device, the bend-pulleys being able to be mounted on a frame surrounding a container to be discharged, or directly on the walls of the building. Instead of a cable tackle it is also possible to utilize a chain tackle.

BRIEF DESCRIPTION OF THE DRAWINGS

The invention will now be described with reference to the drawings by way of example.

FIG. 1 is a diagrammatically and perspective view showing the discharge device of the invention as attached to a framework in the lowered state without any aspiration device, a front support post of the framework having been cut away in order to make the drawing more straightforward;

FIG. 2 is a representation similar to that of FIG. 1 with an octabin having a lining foil sack, which contains the granular material to be discharged, the foil sack lining being gripped by the discharge device, the latter being illustrated in the raised position;

DESCRIPTION OF THE PREFERRED EMBODIMENTS

Figure 7:
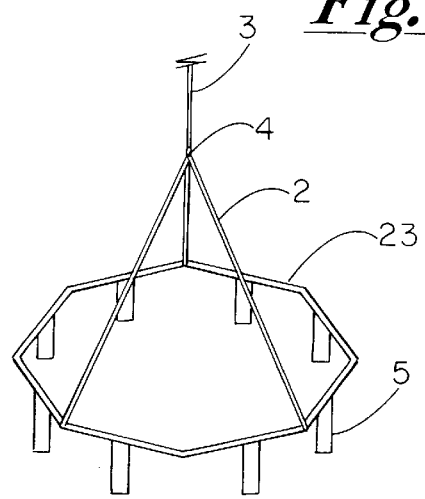
FIG. 7 is a perspective view showing a polygonal frame.

As indicated in FIG. 1, the discharge device of the invention has as its main parts an annular holding frame 1 of flexurally stiff material, as for example, steel which by means of three traction elements in the form of cables 2 is suspended from cable tackle 3. Alternatively, a polygonal holding frame 23 shown in FIG. 7 may be employed.

The cables 2 are of the same length and are regularly arranged around the periphery of the holding frame 1, that is to say, their bottom ends are secured to the holding frame 1, whereas their opposite ends run together to a central connection point 4, where they are connected with the cable tackle 3. This three-point suspension ensures that the holding frame 1 is suspended in a statically stable or predetermined manner, it lying in a horizontal plane.

Figure 3:
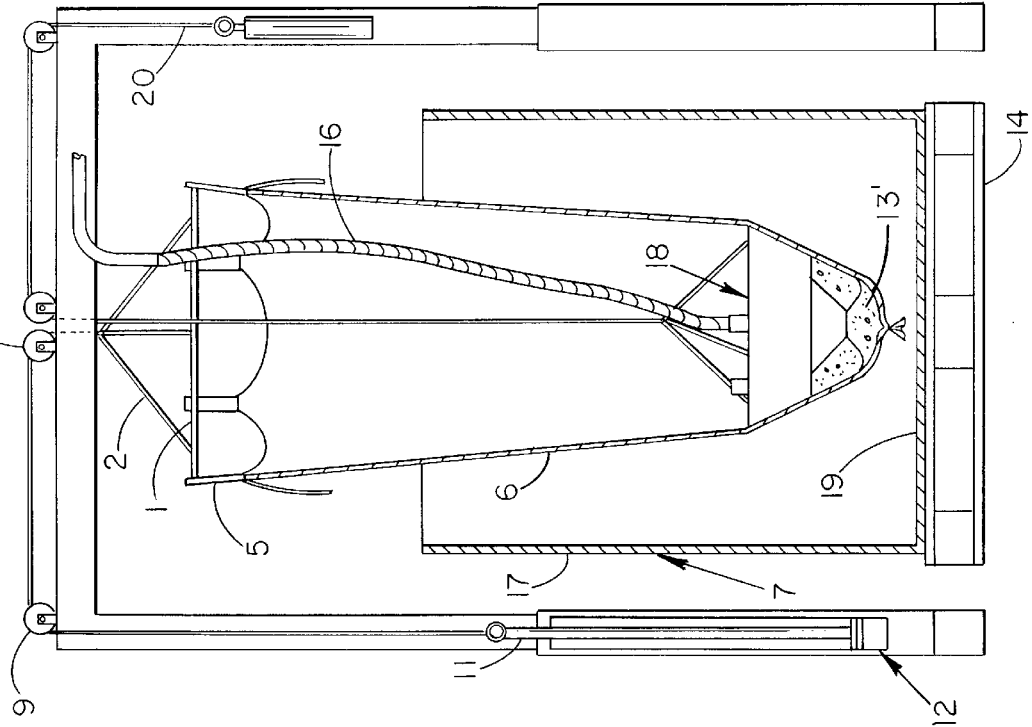
FIGS. 3 and 4 show partially sectioned side views of the discharge device of the invention with an octabin and an aspiration device, the positions at the start and, respectively, at the end of the aspiration operation being illustrated.
Figure 4:
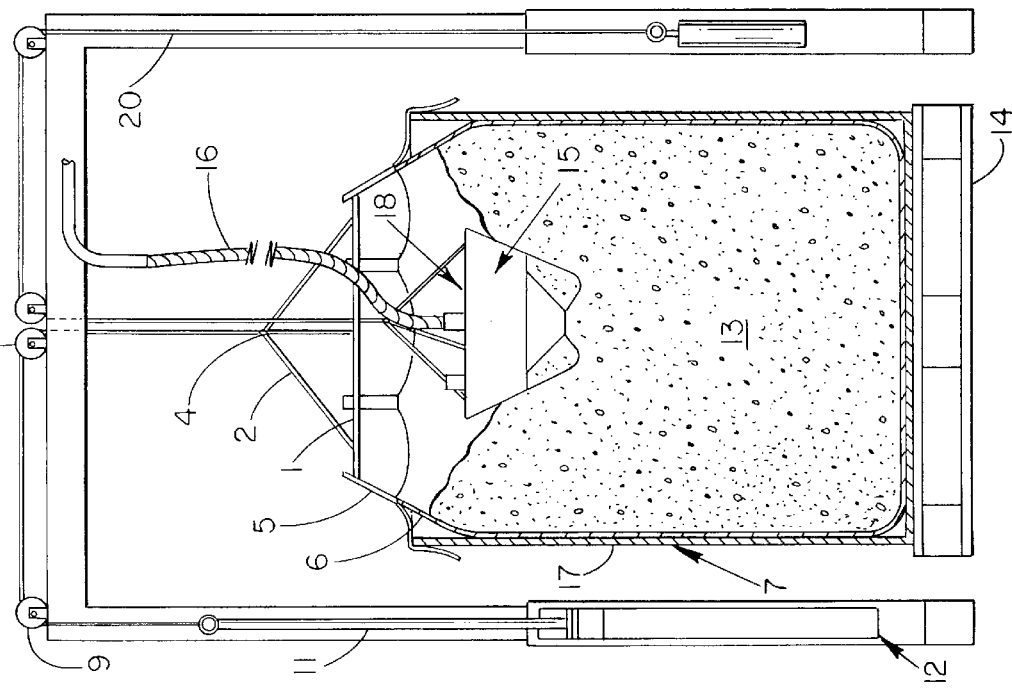

From the holding frame 1 there extend down eight clamping elements 5 for a foil sack 6, illustrated in FIGS. 2 through 4, such foil sack representing the lining of an octabin 7, wherein the granular material, as for example, plastic granules is contained.

Clamping elements 5 are regularly arranged around the periphery of the holding frame 1, i.e., they are at a regular distance from one another while being pivotally secured to the holding frame 1. In the illustrated working embodiment of the invention, the clamping elements 5 comprise two clamping jaws, between which the top edge part of the foil sack 6 may be slipped, whereupon the clamping jaws are thrust together with the foil sack being between them. In order to ensure a reliable holding action on the foil sack 6 between the clamping jaws, same may be provided with suitably adapted rubber surfaces or ribbed surfaces.

The cable tackle 3 runs over bend-pulleys 8 and 9, which are arranged on the top of a framework 10.

The way in which the cables are trained ensures that the cable tackle 3 firstly extends vertically upward toward the top side of the framework 10 and thence in a horizontal direction as far as the bend-pulley 9, which is located adjacent to the top corner of the framework 10. From the bend-pulley 9, the cable tackle 3 then extends vertically downward to have its free end attached to the piston rod 11 of a power cylinder 12. The power cylinder 12 may be designed for pneumatic or hydraulic operation. As an alternative to a power cylinder, it is also possible to provide other alternative reciprocating drive devices, such as for example, an electric motor or a manually operable crank.

In FIG. 1, the piston rod 11 of the power cylinder 12 is fully extended so that the holding frame 1 together with the clamping elements 5 attached thereto constitute lifting tackle, same being located in its lowest position.

In this lowest position or, respectively, in a position which is only raised a small amount of the lifting tackle, it is possible for the octabin 7 containing the granular material 13 and resting on a palette 14, as shown in FIG. 3, to be moved, for example using a forklift truck, into the inside of the portal-like framework 10 until the octabin 7 is located centrally underneath the lifting tackle. Following this, the clamping elements 5 are secured on the top edge part of the foil sack 6 and an aspiration discharge device is introduced from above into the foil sack 6. In the case of the aspiration discharge device 15 it may be, as indicated in FIGS. 3 and 4, a floating aspiration head 18 which is connected to an aspiration hose 16, or in this case alternative by, merely an aspiration discharge tube alone, which is introduced into the foil sack 6 from above like a vacuum cleaner aspiration tube. The granular material 13 is aspirated and removed from the foil sack 6 using the aspiration hose 16. Since the aspiration discharge device 16 is known as such, same will not be described in detail.

At the beginning of the discharge operation which is depicted in FIG. 3, the foil sack 6 is at least substantially full of granular material 13 so that as far as a point adjacent to the top edge part of a rigid, octagonal external casing 17, it is thrust against the inner surface of the external casing 17. Since in this initial stage the holding frame 1 is located in a relatively low position, the piston rod 11 of the power cylinder 12 is extended to a relatively low position, the piston rod 11 of the power cylinder 12 will be extended to a relatively large degree.

During the discharge by aspiration of the granular material 13, the piston rod 11 is continuously drawn into the interior of the power cylinder 12 so that the lifting tackle is moved upward accordingly, and the foil sack 6 is drawn up tight, that is to say, drawn out. Since the holding frame 1 possesses a smaller diameter than the octabin 7, the top edge part of the foil sack 6 will be simultaneously drawn radially inward. This means that the granular flow of the material 13 from the edge parts of the octabin 7 toward its center will be aided, where the aspiration discharge head 18 of the discharge device 15 is located.

As discharge progresses, the foil sack 6 is also drawn upward more and more by the reciprocating device 12 so that the foil sack 6 will be continuously and increasingly drawn out.

The condition of complete or at least almost-complete discharge of the octabin 7 is depicted in FIG. 4. In this state, the foil sack 6 will have a diameter which is substantially less than that of the rigid outer casing 17, it only being in the lowest part of the foil sack 6 that granular material is left at 13'. This granular material left at 13' is located only underneath and not, however, laterally adjacent to the discharge aspiration head 18, against which the lower part of the foil sack 6 bears at the side.

In the discharged state of the octabin 7, the piston rod 11 is at least substantially drawn back into the interior of the power cylinder 12 so that the lifting tackle is raised to such an extent that the foil sack 6 is lifted to be just clear of the floor 19 of the outer casing 17 of the octabin. This will indicate to the operator that the octabin 7 is discharged and may be replaced.

The terminal positions of the power cylinder 12, i.e., the maximum positions of extension and retraction of the piston rod 11 are preferably set by suitable limit switches, not illustrated, in order to provide for adaptation to different heights of container.

A further cable tackle designated 20 illustrated in FIGS. 3 and 4 merely serves to provide for compensation of weight for the discharge head 18 so that same rests with a predetermined degree of force on the granular material 13 and floats on same. This compensation of weight is not described here in detail.

Figure 5:
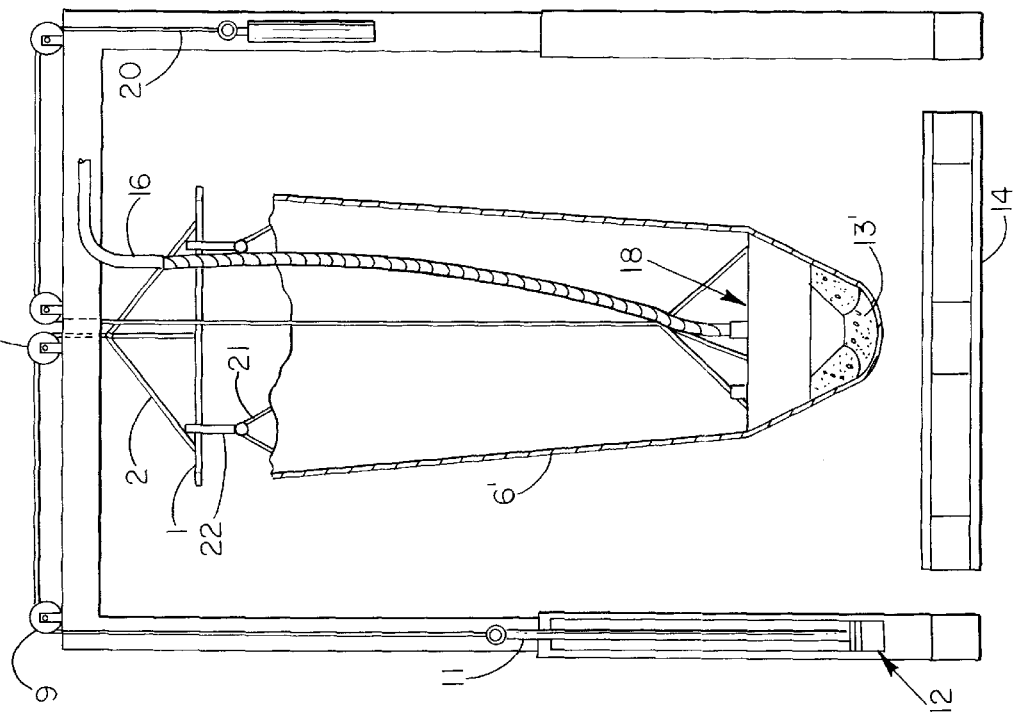
FIGS. 5 and 6 show a representation similar to FIGS. 3 and 4, of a big-bag having handles being depicted.
Figure 6:
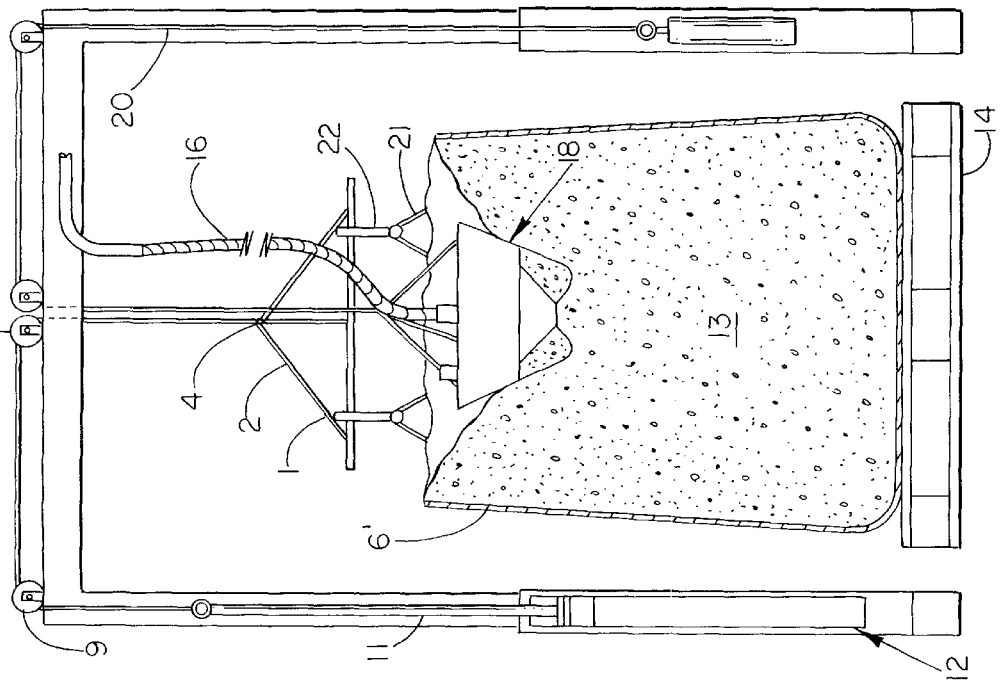

In the case of the alternative design depicted in FIGS. 5 and 6, it is not an octabin which is handled, but rather a so-called big-bag 6', which does not have any rigid outer casing and only comprises a tear-resistant fabric sack. At the top edge of the big-bag 6' four handles 21 are provided for use in shipping.

The alternative design illustrated in FIGS. 5 and 6 of the discharge device of the invention differs from that of FIGS. 1 through 4 only to the extent that instead of the clamping elements 5, hooks 22 are secured to the holding frame 1, which fit into the handles 21 in order to draw up the big-bag 6' during discharge of the granular material 13 in a suitable fashion. The remaining design and manner of operation of this discharge device is identical to that of the first mentioned design.

Figure 8:
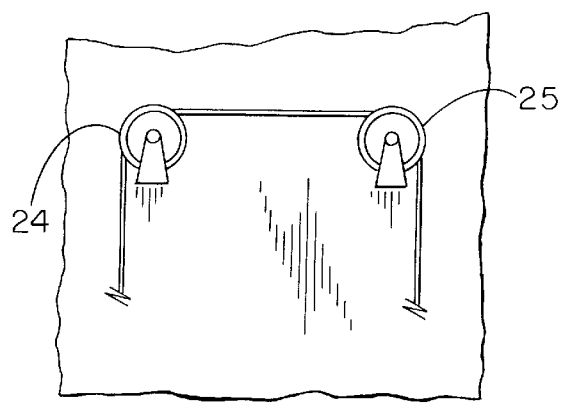
FIGS. 8 and 9 show in side elevation a pair of bend pulleys mounted upon a building wall and a building ceiling respectively.
Figure 9:
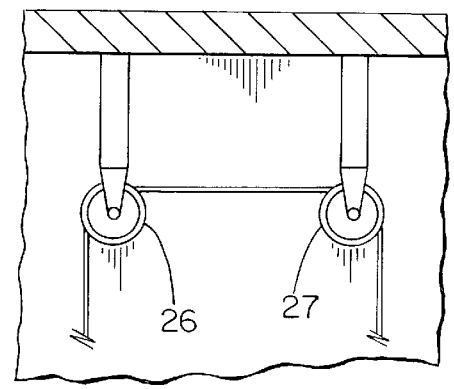

Shown in FIGS. 8 and 9 are alternative means for training the cable tackle 3. FIG. 8 shows a pair of bend pulleys 24 and 25 mounted to a lateral wall of a building in a conventional manner. FIG. 9 shows a pair of bend pulleys 26 and 27 mounted to a ceiling of a building in a conventional manner.

What is claimed is:

1. A lifting assembly for use with a discharge aspiration device introducible from above into a flexible, sack or bag-like container for discharge of flowable granular material therefrom, the assembly comprising lifting tackle movable in a vertical direction for drawing out the container, wherein the lifting tackle comprises holding elements engageable with a top edge part of the container, an annular or polygonal holding frame movable in a vertical direction, and a reciprocating device for moving the holding frame, wherein the holding elements are attached to the holding frame and wherein the holding frame has a smaller diameter than the container so that the top edge part of the container is drawn radially inward as the container is drawn upward and the flowable granular material is discharged therefrom.

2. The lifting assembly as claimed in claim 1, wherein the holding elements are distributed with a regular spacing about a periphery of the holding frame.

3. The lifting assembly as claimed in claim 1 or in claim 2, wherein the holding elements comprise clamping elements or hooks for grippingly engaging a container wall.

4. The lifting assembly as claimed in claim 1, wherein the lifting tackle further comprises cable tackle actuated by the reciprocating device for moving the holding frame.

5. The lifting assembly as claimed in claim 4, further comprising a framework surrounding the container to be discharged and bend-pulleys on the framework for training the cable tackle thereover.

6. The lifting assembly as claimed in claim 4, further comprising bend-pulleys attached to walls of a building for training the cable tackle thereover.

7. The lifting assembly as claimed in claim 1, wherein the holding frame is suspended at three points which are regularly distributed about a periphery thereof, the holding frame being moveable using cable tackle actuated by the reciprocating device for moving the holding frame.

8. The lifting assembly as claimed in claim 4 or in claim 7, wherein the lifting tackle further comprises three traction elements suspending the holding frame which at one respective end thereof are attached to the cable tackle.

* * * * *